United States Patent
Rouet

[15] 3,706,848
[45] Dec. 19, 1972

[54] OPTICAL SYSTEM FOR A CAMERA
[72] Inventor: Paul Rouet, Marcinelle, Belgium
[73] Assignee: Ateliers de Constructions Electriques de Charleroi (ACEC) Societe Anonyme, Charleroi, Belgium
[22] Filed: March 5, 1971
[21] Appl. No.: 121,498

Related U.S. Application Data
[63] Continuation-in-part of Ser. No. 680,912, Nov. 6, 1967, abandoned.

[52] U.S. Cl..........................178/7.92, 95/1 R, 350/6, 350/41, 350/46
[51] Int. Cl..........................G02b 13/06, G02b 13/16
[58] Field of Search..........95/15, 16, 17; 352/69, 70, 352/71, 93, 94; 178/7.92; 350/6, 21, 22, 24, 25, 26, 48, 49, 41, 46; 355/55

[56] References Cited

FOREIGN PATENTS OR APPLICATIONS 1,158,363    7/1969    Great Britain............................350/6

*Primary Examiner*—Robert L. Griffin
*Assistant Examiner*—George G. Stellar
*Attorney*—Raymond A. Robic

[57] ABSTRACT

An optical system for a camera which comprises a front objective and a microscope assembly located behind the front objective. The said assembly comprises a microscope objective which is individually tiltable in order to increase the angular field of the optical system.

8 Claims, 2 Drawing Figures

PATENTED DEC 19 1972

3,706,848

INVENTOR
PAUL ROUET

OPTICAL SYSTEM FOR A CAMERA

CROSS-REFERENCE TO RELATED APPLICATION

This is a Continuation-in-Part application of U.S. application Ser. No. 680,912, now abandoned.

BACKGROUND OF THE INVENTION

The present invention relates to an optical system for photographic or television cameras that makes it possible to observe, at varying depths, a relatively wide angular space, while the orientation of the camera remains fixed.

SUMMARY OF THE INVENTION

The optical system for cameras according to the invention is characterized by a scanning assembly having a tiltable optical axis comprising an eyepiece and a scanning objective scanning a real image of the angular space under observation. The image is obtained by means of an auxiliary front objective and by a mechanical device adapted to vary the angle of inclination of the optical axis of the scanning assembly. The optical axes of the eyepiece and of the front objective may coincide. The front objective may be a wide-angle lens or, namely, a well known zoom lens. The optical system for cameras may also be pivotable about the optical axis of the eyepiece. Appropriate mechanical devices are provided to obtain the aforesaid movements.

The advantage of such an optical system is particularly marked when mounted on a picture-taking tube of a television camera and when one or several of the mechanical devices are controlled in relation to the video signal transmitted by the picture-taking tube. It is then possible to automatically follow a movable object moving in the angular space under observation through electric controls acting on the mechanical devices of the optical system. Through these mechanical devices, the image of the movable object may for instance be automatically centered always about the center of the screen and the magnifying power of the optical system may constantly be adjusted to preserve the same magnitude of the image of the movable object, independently of the depth through which the movable object is displaced in the space under observation. The optical system according to the invention may also be used with great advantage when, for instance, identical or similar objects having fixed positions in a relatively wide space must be periodically observed, one after the other, either singly or by groups of several. Such a case is constituted, for instance, by ground lights in an installation for measuring the maximum distance of visibility in the fog, as in my in U.S. Pat. No. 3,501,239 issued on Mar. 17, 1970. The control of the mechanical devices may then be carried out in relation to the known positions of the ground lights to be controlled.

BRIEF DESCRIPTION OF THE DRAWINGS

The invention will hereinafter be explained in relation to a preferred embodiment illustrated in the appended drawing, wherein.

DESCRIPTION OF THE PREFERRED EMBODIMENT

Figure 1:
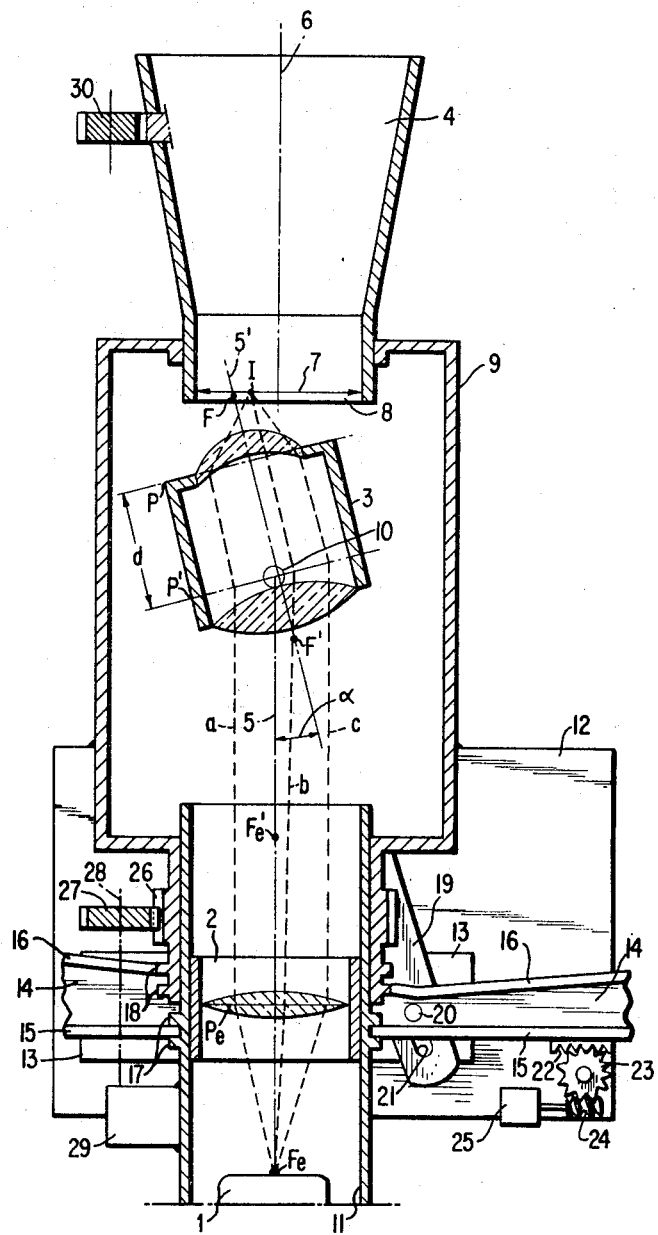
FIG. 1 is a cross-sectional view of an optical system according to the invention.
Figure 2:
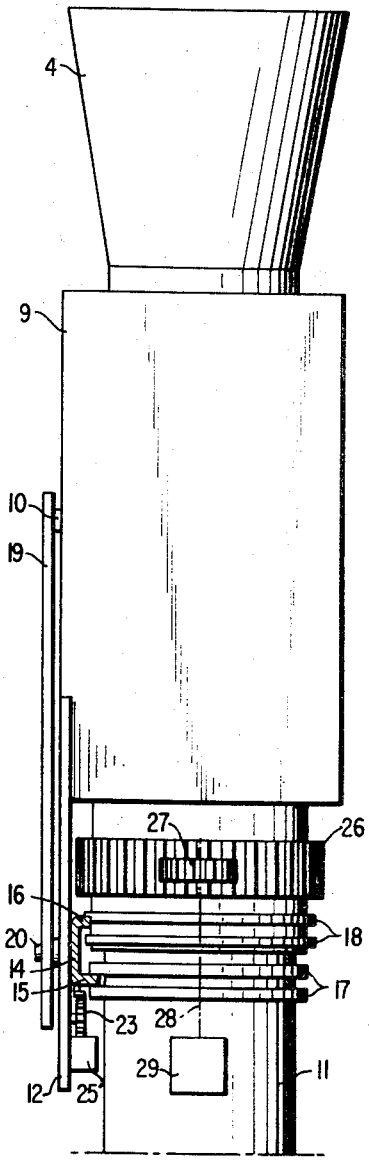
FIG. 2 is a side plan view thereof.

A picture-taking tube 1, for instance a "Vidicon" is provided with an optical system constituted by an eyepiece 2 (in fact, this is not an eyepiece but an objective or lens projecting a real image on the photo-sensitive plate or target of the picture-taking tube), a scanning objective leans 3 and an auxiliary front objective lens 4. The scanning assembly 2, 3 has an optical axis 5 of which at least a part is tiltable, a small angle $\alpha$, defining a new axis 5'.

The front objective lens 4 comprises an optical axis 6 and forms a real image 7 of the space under observation. This real image 7 is scanned by the scanning objective 3, small portion by small portion, according to a line defined by the intersection of the plane of the image 7 and of the plane determined by the broken optical axis 5'. In order to easily locate the object on the observation screen, the film, etc., a graticule 8 may be disposed over the real image 7. Besides, in order to allow scanning of the complete real image 7 by the objective 3 the latter may be made pivotable about the optical axis 5 of the eyepiece 2, either alone or together with the front objective 4. The front objective 4 may also be inclined, with respect to the optical axis 5 if the angular space to be observed is very wide, but if the angular space to be observed makes it possible, it is held fixed with its optical axis 6 coinciding with the optical axis 5 constituting the axis of the eyepiece 2.

If on the contrary the angular space to be observed is very large, the axis 5 may be fully pivoted around a center of rotation which is, for example, the center of the target of tube 1.

In the example illustrated in FIG. 1, only axis 5' corresponding to the objective 3 is pivotable. The objective 3 is represented in FIG. 1 by two positive focus lenses with the two principal conjugate planes P and P'. Of course other lens arrangements may be used for objective 3 to set up principal planes P, P' in a manner well known in the art. The two planes P and P' are spaced from one another by a considerable distance, that is by a distance of the order of at least half the real image 7 of the space to be observed. However, this condition is not necessary if the center of rotation happens to be on the target of tube 1 or at a proximate distance from this target. The point of intersection of the plane P' which faces the eyepiece 2 with the axis 5 constitutes the center of rotation of the pivotable objective 3. The selection of this center of rotation is not critical but it is advantageous that it be chosen between the secondary focus F' and the point of intersection of the axis 5 with the plane P'. The objective 3 is suspended inside the casing 9 on an axle 10 perpendicular to the axis 5. The eyepiece 2 is maintained in a tube 11 on which is slidingly mounted a tubular end member of the casing 9. The eyepiece 2 is represented by its principal plane $P_e$ and its two focal points $F_e$ and $F'_e$.

The objective 3 explores, piece by piece, the real image 7 formed by the front objective 4. Considering, for example, the point I shown in FIG. 1, lines $a$ and $c$ define a light cone which emerges from point I and is brought to focus on tube 1 at point $F_e$. Because the point I is located on the focal plane of the principle focal point F of the tilted objective 3, the light from point I emerges from lens system 3 as a beam of parallel rays. The direction of this parallel beam is determined by the straight line which connects the focal point F' with the point of intersection of the principal plane P' and a straight line parallel to the axis 5' of the objective 3 passing through point I. Such a line is indicated in FIG. 1 by dotted line b. Points adjacent to point I transmit light rays which are refracted by objective 3 and emerge essentially parallel, but the direction of this beam (found by a similar construction as described above) is slightly inclined relative to axis 5 of objective 2. Consequently the light cone emanating from these adjacent points defines images in the neighborhood of $F_c$, as described Of course, points not closely adjacent to point I will be refracted at a relatively large angle with respect to axis 5 and will not fall on the target of tube 1. However, for the proper tilt angle $\alpha$, any desired point I may be focused on the target of tube 1.

Since the light beam between the two objectives 2 and 3 is substantially parallel, the real image on the target of the tube 1 is not affected by small longitudinal variations of this parallel light beam. It is then possible to foresee small adjustments so as to obtain a clear image for any inclination of the objective 3. The main adjustment necessary to obtain a clear image for a given inclination of objective 3 is to translate objective 3 forward or backward (i.e., forward along the direction of axis 5 toward objective 4 or backward along the direction of axis 5 toward eyepiece 2) so that a given point of interest, I, lies on the focal plane of objective 3. This adjustment and others are made possible by mechanical devices described below.

Objective 4 and the tube 11 are connected to an outer fixed frame (not illustrated) which maintains them at a predetermined distance from one another. The casing 9 may rotate about the tube 11 and may produce equally small axial translations along this latter. These movements may be controlled by hand or by an automatic device. On the drawing, an automatic control device is shown. A supporting plate 12 provided with an opening 13 is welded to the casing 9. A translation bar 14 provided with two longitudinal flanges 15 and 16 are guided along the said plate 12 in a perpendicular direction to the tube 11. The tube comprises a pair of ribs 17 in which is engaged the flange 15 of the translation bar 14. The tubular end of the casing 9 also comprises a pair of ribs 18 in which is engaged the flange 16 of the translation bar 14. The objective 3 is rigidly secured to the lever 19 through its rotation axle 10. The lever 19 is connected to a pivot 20 which is solidly secured to the translation bar 14 through the slot 21. The pivot 20 passes through the aperture 13 of the plate 12 and passes through the slot 21. The translation bar 14 comprises a toothed rack 22 whose teeth are engaged to the teeth of the toothed wheel 23 which is moved by the pinion 24 actuated by the motor 25 fixed to the plate 12. By means of the motor 25, it is possible to displace the bar 14 and therefore to modify the inclination angle, $\alpha$, of the objective 3 and, at the same time, the distance of objective 3 from the image plane 7. Angle $\alpha$ changes since it is determined by the position of pinion 20. Objective 3 moves forward or backward since it is rigidly attached to casing 9 which is itself displaced because of the curve given to flange 16.

This curve is determined, for example, during a series of adjustments made by hand for different inclinations of the objective 3. It is also possible to move the casing 9 about the axis of the tube 11. To this end, the toothed ring 26 circles the tubular end of the casing 9. A toothed gear 27 engages in the toothed ring 26. The gear 27 is maintained by an axis 28 of a motor 29 fixed on the tube 11 by means of screws or the like.

The zoom objective 4 may be adjusted by means of an appropriate mechanism such as a toothed gear 30 schematically shown in FIG. 1. Such a control is well known for zoom objectives and does not constitute an essential part of this invention. If it is necessary and if the luminosity of the observed object permits it, the eyepiece 2 which is illustrated by only one principal plane (which corresponds to only one thin lens) may also be a zoom objective. In such a case, the magnification of the eyepiece 2 may vary through a very large range. According to another embodiment, the front objective 4 may be a wide angle lens.

If the optical system is directed to follow a movable objective according to a specific or unknown path, the motors 25 and 29 as well as the mechanism controlling the focal distance of the zoom objective may be actuated through an analyzer (not shown) of the video signal obtained at the output of tube 1. This analyzer which is not an essential part of the invention may also control the motors 25 and 29 as well as the mechanism controlling the focal distance of the zoom objective in such a manner that the image of the observed object is always located at the same place, for example, at the center of the target of the picture-taking tube 1 and always possess approximately the same size independently of its actual position within the angular space accessible to the objective 4.

I claim:
1. An optical system for a camera, comprising:
   a. a first objective lens for forming a real image on a plane of the space under observation;
   b. a second objective lens having a principle focal point, F, positioned adjacent to a portion of said real image plane of the space under observation; plate;
   c. an eyepiece aligned with output means from said second objective lens, for projecting a real image of said portion on a photosensitive plate: and
   d. mechanical means for tilting said second objective lens with respect to the optical axis of said eyepiece and axially moving said second objective lens along the optical axis of said eyepiece for focusing the said second objective on the said real image of the space under observation.

2. An optical system as recited in claim 1, wherein the optical axis of the eyepiece and of the second objective are coaxial and wherein the mechanical tiltable means enable the optical axis of the second objective to pivot in a plane passing through the optical axis of the eyepiece.

3. An optical system as recited in claim 1, wherein the first objective has a variable focal distance, and including mechanical means to adjust the said focal distance.

4. An optical system as recited in claim 1, wherein the second objective is pivotable about the optical axis of the eyepiece and including mechanical means to pivot said second objective.

5. An optical system as recited in claim 1, wherein the eyepiece consists of a variable focal distance lens.

6. An optical system as recited in claim 1, mounted on a television camera wherein the first objective and the eyepiece have variable focal distance and devices to automatically adjust the said focal distances and an arrangement to automatically pivot the second objective about the optical axis of the eyepiece.

7. An optical system as recited in claim 1, wherein a graticule is located in the plane of the image formed by the first objective.

8. An optical system as recited in claim 1 wherein the mechanical means tilts the second objective lens and simultaneously axially moves the second objective lens whereby for every small indication angle of the second objective lens the focal point F is maintained closely positioned adjacent to said real image plane of the space under observation.

* * * * *